US012704834B2

(12) United States Patent
Eckl et al.

(10) Patent No.: US 12,704,834 B2
(45) Date of Patent: Aug. 11, 2026

(54) SYNCHRONIZING INFORMATION MODEL CHANGES BETWEEN HIERARCHICAL SYSTEMS OF SMART FACTORIES

(71) Applicant: Siemens Aktiengesellschaft, Munich (DE)

(72) Inventors: Roland Eckl, Forchheim (DE); Anandrao Todkar, Plainsboro, NJ (US); Phani Ram Kumar Kuruganty, Robbinsville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 19 days.

(21) Appl. No.: 18/873,874

(22) PCT Filed: Jul. 13, 2022

(86) PCT No.: PCT/US2022/036944
§ 371 (c)(1),
(2) Date: Dec. 11, 2024

(87) PCT Pub. No.: WO2024/015054
PCT Pub. Date: Jan. 18, 2024

(65) Prior Publication Data

US 2025/0370438 A1 Dec. 4, 2025

(51) Int. Cl.
*G05B 19/418* (2006.01)

(52) U.S. Cl.
CPC .. *G05B 19/4185* (2013.01); *G05B 2219/2609* (2013.01)

(58) Field of Classification Search
CPC .................... G05B 19/4185; G05B 2219/2609
See application file for complete search history.

(56) References Cited

U.S. PATENT DOCUMENTS 12,572,134 B2 * 3/2026 Amaro, Jr. ......... G05B 19/4155
2020/0380013 A1 12/2020 Mahbod et al.
(Continued)

FOREIGN PATENT DOCUMENTS

EP 3582125 A1 12/2019
WO WO-2016155856 A1 * 10/2016 ............. F22B 35/18
WO 2021180304 A1 9/2021

OTHER PUBLICATIONS

OPC Foundation: "OPC Unified Architecture Specification Part: 1 Overview and Concepts, Release 1.01", Feb. 5, 2009 No. Release 1.01 Feb. 5, 2009 (Feb. 5, 2009), pp. 1-28, XP002630848, Retrieved from the Internet: URL:https://www.opcfoundation.org/Downloads.aspx/UnifiedArchitecture/OPCUAPartl-OverviewandConceptsl.01Specification.zip?RI=414[retrieved on Mar. 31, 2011]the whole document.

*Primary Examiner* — Asad M Nawaz

(57) ABSTRACT

System and method for synchronizing information model changes between hierarchical systems of a smart factory are disclosed. A model generator instantiates objects for an aggregated information model for each of a plurality of subsystems in the smart factory based on an OPC UA standardized model. A synchronization engine maintains a global timestamp variable for a last successful synchronization performed by a parent OPC UA server for syncing to a second aggregated information model instance stored in a lower level OPC UA server. Model nodes are annotated with a node-wise timestamp in response to a modification to the node. All nodes subject to modification are pushed to a priority queue as a serialized node set format having annotation extensions that include synchronization-relevant data. The first and second aggregated information model are synchronized by updating nodes with the synchronization-relevant data.

13 Claims, 6 Drawing Sheets

(56) References Cited

U.S. PATENT DOCUMENTS

2021/0373516 A1* 12/2021 Shivamurthy .......... H04L 12/28
2024/0004514 A1* 1/2024 Sarin ................... G06F 3/04817

* cited by examiner

SYNCHRONIZING INFORMATION MODEL CHANGES BETWEEN HIERARCHICAL SYSTEMS OF SMART FACTORIES

TECHNICAL FIELD

This application relates to information modeling. More particularly, this application relates to synchronizing information model and data exchanges between hierarchical systems of smart factories.

BACKGROUND

A smart factory, also known as a connected factory, is a digitized manufacturing facility that uses connected devices, machinery and production systems to continuously collect and share data. This data is then used to inform decisions to improve processes as well as address any issues that may arise. The smart manufacturing practices used by a smart factory are enabled by a variety of technologies including artificial intelligence (AI), big data analytics, cloud computing, and the Industrial Internet of Things (IIoT). A smart factory relies on providing seamless exchange of information between systems at various manufacturing hierarchical levels.

A technical problem one faces in this industry is that different information models are created individually within various industrial control and software systems, such as programmable logic controllers (PLCs), supervisory control and data acquisition (SCADA), historian, and in cloud applications. Often, these various information models do not match in schema and hence inconsistencies arise. Much effort can be expended in terms of manual engineering of such information models and in attempting to connect the information models while keeping the information in sync. Prior art solutions are dependent on manual information model onboarding in the cloud and then having data sent on an already established model. Changing information semantics on one system (e.g., bottom level devices) requires significant re-engineering effort on the other side of the hierarchical system (e.g., cloud). As such, the cost of maintaining consistent information at various levels in a smart factory is very high.

SUMMARY

System and method for synchronizing information model changes between hierarchical systems of a smart factory are disclosed. A model generator instantiates objects for an aggregated information model for each of a plurality of subsystems in the smart factory based on an Open Platform Communications United Architecture (OPC UA) standardized model. OPC UA is a data exchange standard for industrial communication (e.g., machine-to-machine, PC-to-machine). A synchronization engine maintains a global timestamp variable for a last successful synchronization performed by a parent OPC UA server for syncing to a second aggregated information model instance stored in a lower level (i.e., child) OPC UA server. Model nodes are annotated with a node-wise timestamp in response to a modification to the node. All nodes subject to modification are pushed to a priority queue as a serialized node set format having annotation extensions that include synchronization-relevant data. The first and second aggregated information models are synchronized by updating nodes with the synchronization-relevant data.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Figure 1:
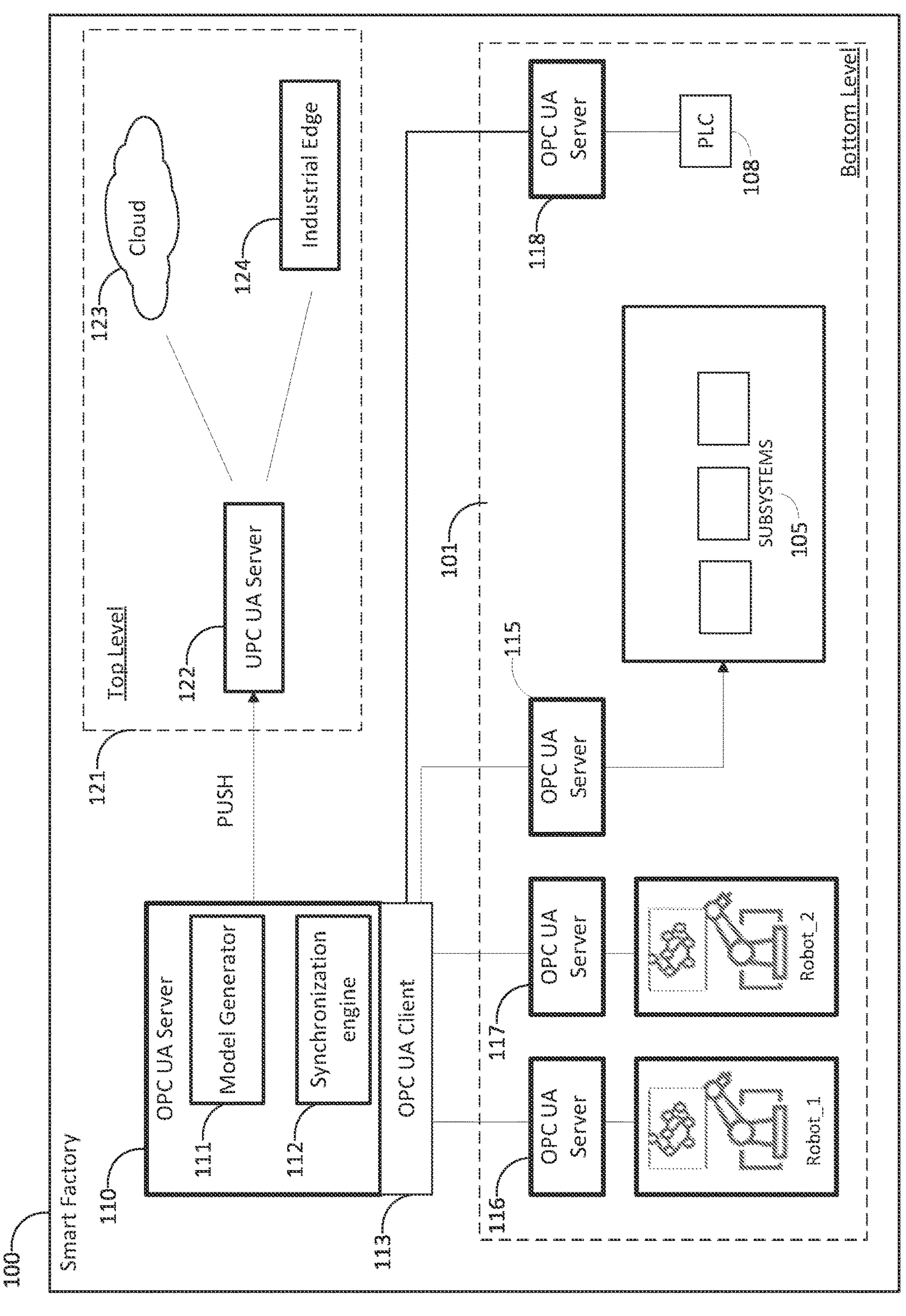
FIG. 1 illustrates a framework for synchronizing changes to information models across levels of a hierarchical system in a smart factory in accordance with the embodiments of this disclosure.

Methods and systems are disclosed to create, manage, synchronize and serve information seamlessly across all the hierarchal levels in a smart factory for both bottom up and top down information exchanges. For example, the information from the bottom level subsystems (e.g., at the shopfloor) like robots and computer numerical control (CNC) machines needs to be available continuously at upper levels (e.g., cloud) for monitoring, dashboarding and analytics purposes. A technical problem for information model sharing is to timely and accurately reflect the changes in bottom level operations due to production downtime, upgrades, etc. Information may also be enhanced at the top level as a result of business intelligence which can directly affect the operations on the bottom level in terms of optimizing processes (e.g., throughput) or resources (e.g., energy consumption).

The embodiments of this disclosure automate the process of engineering and synchronization of information (schema as well as data changes) between various levels in smart factories (e.g., shopfloor to cloud and vice versa). In an aspect, information models are engineered using the OPC-UA standard, thereby taking advantage of the availability of already existing companion specifications. The schema and data associated with information generated on the shopfloor are automatically synced with zero engineering effort in near real time with upstream subsystems that aggregate information from several subsystems. In an aspect, object model updates are pushed to a computer with high level computing capability, typically as a cloud-based computer, where detailed data analysis is performed. Object model updates may also be pushed to other computing devices, such as at the Edge, or on the shop floor. Thus, information is instantaneously received at upper levels of the hierarchical system allowing for near real-time monitoring, dashboarding and analytic use cases. With automation of information model pushing and synchronization, steps to create and maintain models at several levels are avoided. A technical advantage of the disclosed embodiments includes pushing object model structure information rather than pushing all data as a data streaming process. With a replica model at the upper levels capable of generating data just as devices on the shop floor, the need for sending all sensor data upstream in real time is eliminated. This improves responsiveness by avoiding lags in conventional systems that stream all data.

Configuration for syncing is done on an OPC-UA server of one of the downstream systems. These systems implement model pushes to the next higher level systems as soon as information is changed. The semantics of the information are thereby preserved between the shopfloor and the cloud, providing a unified way to query consistent information throughout all levels of the hierarchical system.

The OPC UA standardized model is designed to be platform independent. It relies on an object oriented framework where information is specified in terms of objects and associated variables, methods, and attributes. OPC UA operates with a protocol binding layer with standardized transports and encodings. Transports can include client/server (e.g., RCP, HTTPS protocol for one-to-one communication) and Pub/Sub (e.g., UDP, TSN, QMQP, MQTT protocol for one-to-many communication). Encodings can include both client/server and Pub/Sub (e.g., UA binary, JSON, XML). However, OPC UA has no built-in mechanism for model synchronization. While there are mechanisms for notification of model changes, there is insufficient capability to build a sophisticated synchronization mechanism. For example, using the OPC UA mechanisms unmodified would not serve to adequately deal with a connection loss, as there is no information whether or which portions of the information model changed in the meanwhile. This leads to cumbersome re-browsing the address space after reconnecting. The publish/subscribe (Pub/Sub) messaging mechanism of OPC UA does not provide subscriptions on model changes, but instead on value changes only.

In an aspect, the embodiments of this disclosure implement technical improvements made on top of the OPC UA mechanisms. For example, a framework is constructed that uses timestamps and acknowledgements between two system tiers. In addition, XML NodeSet files of the OPC UA protocol are used as a means to carry synch specific information, such as a representation of the information in an OPC UA server. Updates are reflected in the model on the server itself, including any deleted or added nodes on the model. The current OPC UA Pub/Sub mechanism does not support such synchronization capability.

FIG. 1 illustrates a framework for synchronizing changes to information models across levels of a hierarchical system in a smart factory in accordance with the embodiments of this disclosure. Smart factory 100 includes a hierarchical system that includes a bottom level 101 having various subsystems 105, Robot1, Robot2, PLC 108 and a top level 121 with a UPC UA server 122 operating either as a cloud 123 device or an industrial edge 124 device. The hierarchy may include one or more intermediate levels, such as that shown by OPC UA server 110. In some instances, OPC UA server 110 may be an edge device having a parent server 122 being a cloud based device. Subsystems 105 may include shopfloor devices and associated industrial control and software systems such as PLCs, SCADA and historians. A problem to be solved is that each type of shopfloor devices may have its own vendor provided server and the information from these different servers needs to be integrated and synchronized according to the hierarchical structure of the smart factor 100 (e.g., cell, line, plant). For example, a cell may consist of three robots, a line may have three cells and the plant may have twenty lines. A user may elect to set up the synchronization for top level 121 at either a cloud-based server or an edge based server. Different information models may be aggregated at a single server as a plant wide aggregation, such as at UPC UA server 110 or 122. Alternatively, the framework for embodiments of this disclosure may involve localized aggregation on multiple levels. Based on the type of aggregation arrangement, the parent servers are identified and designated for how model information updates are pushed.

Each OPC UA server may be configured as shown by OPC UA server 110, which includes a model generator 111 and a synchronization engine 112. Model generator 111 is configured to instantiate objects for an information model for each respective subsystem 105 and an aggregated information model pushed to the top level 121 for performing monitoring and analytics by UPC UA server 122. For example, an engineer using OPC UA client 113, or a OPC UA client located elsewhere in the smart factory 100, can instantiate a specific PLC 108. Model generator 111 of UPC UA server 122 then models the variables and parameters associated with the particular PLC using a uniform, standardized OPC UA protocol. Similarly, other PLCs as well as all devices (e.g., SCADA, Profinet) in all levels of the smart factory 100 that are OPC UA compliant can be instantiated so that each modeled object has a similar, uniform structure to be read and understood regardless of what kind of hardware or implementation type of device.

Figure 2:
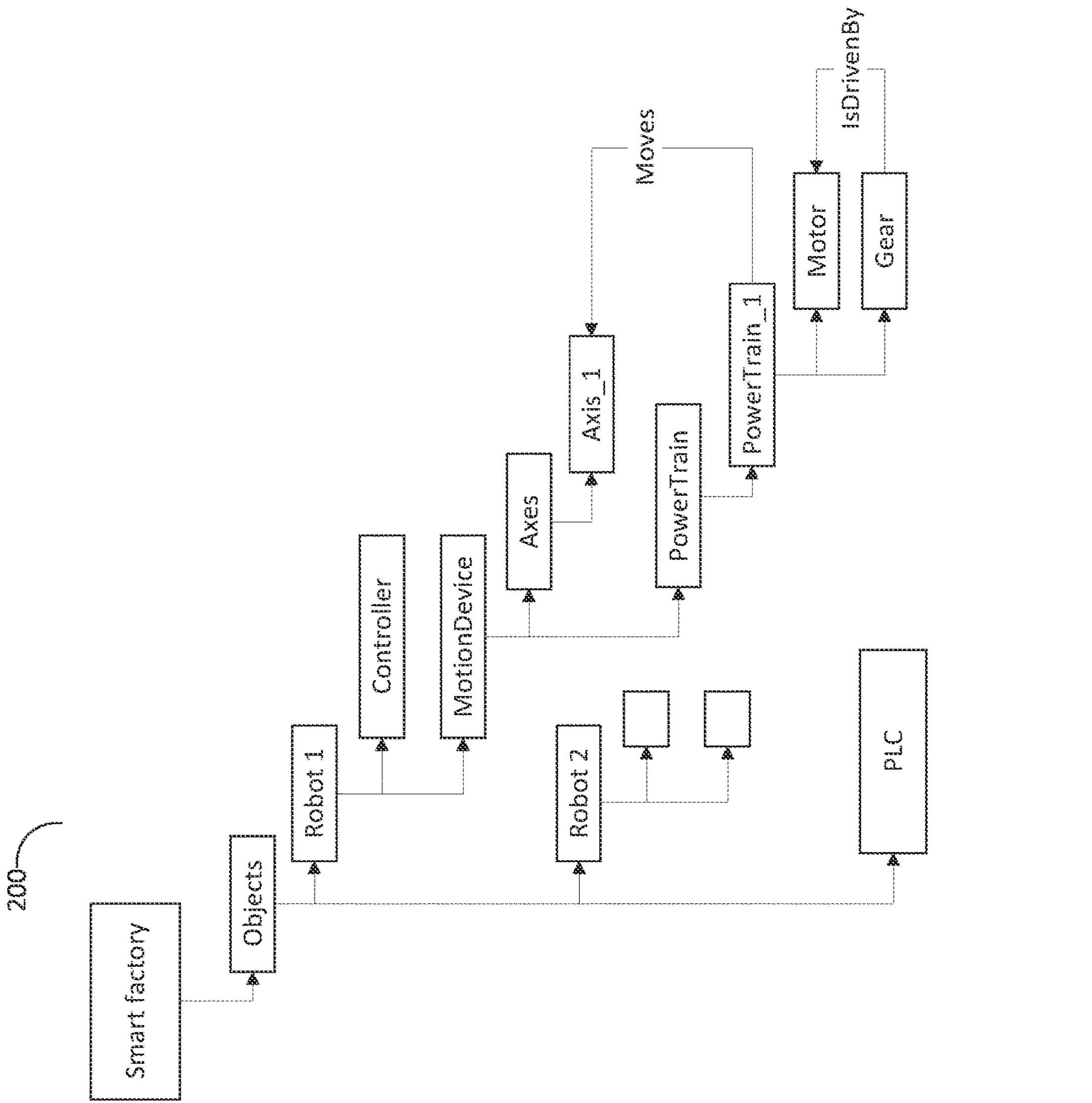
FIG. 2 shows an example of an information model for synchronization in accordance with embodiments of this disclosure.

FIG. 2 shows an example of an information model for synchronization in accordance with embodiments of this disclosure. In this example, a portion of the hierarchy shown in FIG. 1 is represented for illustrative purpose in information model 200. Nodes of the OPC UA-based information model include objects of the smart factory, such as Robot1, Robot2 and PLC. In some instances, nodes are connected by relationships, such as PowerTrain_1 Moves Axis_1, and Gear IsDrivenBy Motor. To illustrate how the need for model synchronization arises, let information model 200 represent the aggregated information model instance for OPC UA server 110. When a change to the information model occurs, such as adding a new node to the model to represent the addition of PLC 108 to the smart factory 100, OPC UA server 118 must synchronize its instance of the information model with the current information model stored by parent server 110. Through messages, timestamps, and/or acknowledgments between servers 110 and 118, the new node for PLC 108 will be added to information model 200. In turn, the model update will be pushed up from OPC UA server 110 to its parent OPC UA server 122.

Synchronization engine 112 of the OPC UA servers is configured to execute automated synchronization of information model changes for each of the subsystems 105 with the aggregated information model used by the parent UPC UA server. In an embodiment, as any information model changes are detected by synchronization engine 112 of OPC UA server 110, the changes are pushed to the aggregated information model of parent OPC UA server 122 in near real time. Synchronization engine 112 is configured to execute synchronization according to one or more of the following design features.

Feature 1: Synchronization is strictly unidirectional from bottom level 101 (e.g., cell level) to top level 121 (e.g., cloud).

Feature 2: OPC UA servers in smart factory 100 are configured with a tree-like system structure, whereby each OPC UA server may have multiple children but only one parent.

Feature 3: Synchronization is independent of the actual transport channel, which can be configured according to platform specifics (e.g., Industrial Edge platform or MindSphere) or even lead to completely different protocols as long as the required qualities are met.

Feature 4: Synchronization is performed on a nodewise granularity. Not all nodes of an information model necessarily have to be included in the synchronization process. For example, some nodes associated with particular lower level subsystem components 105 can be excluded at the discretion of the user to keep the synchronization process leaner and more manageable. As there are nodes representing type definitions (i.e., semantics and properties of a variable) as well as nodes representing instances, some exclusions may include type nodes and others may include instances. As an example of a type node, the type information can be useful by a knowledge graph which extracts information from a large amount of interlinked and semantic data. As a specific example, a motor temperature variable can be used to monitor motor strain, which can be extracted from semantics attached to this variable.

Feature 5: Each synchronized node is acknowledged by the parent server. A parent server acknowledges when it receives processes pushed information for a node object model. In an embodiment, the acknowledgment represents a single node has been synchronized. In another embodiment, the acknowledgement represents a collective synchronization of a set of node model information pushed to the parent server. For example, an Edge-based child OPC UA server may sense the presence of multiple new node object models and push the new model information as a serialized node information format, such as XML NodeSet, to a cloud-based parent server. The parent server deserializes the information into an OPC UA node in the aggregated information model by attaching to an OPC structure or OPC address list. Once this is processed at the parent server, the acknowledgement sent by the parent server indicates that the pushed information for the node(s) has been validated and persisted in the replicated model and therefore will be available in the event of any failure requiring a restart. As a result, on cold-start of a lower level server (e.g., Edge server) following an outage, the replicated model at the parent server can be compared to the repaired model on the lower level server, and the differences between the two models need to be synchronized for checking the repaired model. In this example, the replicated model at the parent server serves as a backup to which the repaired model at the lower level server can be mirrored.

In an embodiment, the acknowledgment is solved through a Pub/Sub mechanism with a broker that can act as a subscriber at the same time. A communication protocol (e.g., MQTT) with QoS level 1 or 2 may then ensure that the message arrived at the well-known subscriber, while a regular setup with a separate broker in between can only ensure the message was received by the broker but gives no indication for the subscribers. In the latter setup, subscribers and publishers are independent of each other. Additionally, an application-level protocol could be used (e.g., acknowledgement on a separate topic).

Feature 6: Synchronization is applied to detected changes in object models; node value changes are not within the scope of the unidirectional synchronization. For example, changes to real time temperature values from a temperature sensor node need not be synchronized.

Feature 7: Synchronization occurs between two aggregated information model instances-one model at a lower level server and the other model at its parent server.

In an embodiment, synchronization engine 112 synchronizes individual nodes (separately or a list of nodes in some kind of bulk operation) built around the OPC UA (XML) node set. Synchronization is done by signaling modifications upward and getting acknowledgement from the parent server that the modification was received and successfully applied. Timestamps are used to keep track of modifications and/or synchronization states. All modifications are signaled via messages carrying at least one affected node which is subject to synchronization. In a bulk operation, several nodes can be packaged into a single message. To avoid overwhelming a parent server with update messages, different messages related to different nodes are not sent in parallel.

Model changes include node addition, node update, and node deletion and are notified using the OPC UA object GeneralModelChangeEventType. A model change event for connected devices at a lower level is detected by the lower level (child) OPC UA server, which then captures the change in the information model for that level. Once the model update is completed, the lower level OPC UA server informs the parent OPC UA server of the change, which initiates the synchronization process between the child OPC UA server and the parent OPC UA server. Generally, value changes are not subject to reporting for synchronization. An exception is for values which have some semantic meaning. For example, a measurement unit that changes from Fahrenheit to Celsius would be notified using the OPC UA object type SemanticChangeEventType, but would be treated like a regular value change in this concept. Nodes being removed, but not yet synchronized, must remain in the local node set while all references pointing to these nodes are already removed. This converts these nodes to hidden nodes on browsing operations. After acknowledgment through the parent server, the nodes can finally be discarded.

Additional knowledge about the composition of node IDs is required for synchronization, since an individual node uses addresses that refer to the local namespace array of the node set or server. When exchanging nodes between two aggregated information model instances, the models either share the same namespace array or provide the local namespace array to the parent for index translation. When sharing the namespace array, namespaces are shared across all aggregated information model instances in the system. This sharing eases addressing efforts by having stable namespace indices through-out the entire system and by enabling usage of short addresses instead of fully-qualified addresses with verbose namespace string.

In an embodiment, node annotations are applied using extensions via OPC UA (XML) node set definition. An extension can have local or proprietary meaning, such as a mapping definition between an internal process image and the OPC UA information model. For example, annotations for mapping tags can be generated using Siemens OPC Modeling Editor (SiOME). Another example is an editor used to create the node set file. Synchronizer engine 112 annotates the nodes with extensions that include synchronization-relevant data. One or more of the following attributes may be included in a node annotation: (1) an indication of whether the node participates in synchronization; (2) any restrictions for a parent server, including adjusted permissions, such as a node that can be read or written locally but shall be read-only on the parent level (e.g., in cloud); (3) scope of synchronization levels, such as maximum number of synchronization levels (e.g., only two synchronizations/hops) or ultimate synchronization level (e.g., only up to plant level, but not cloud); (4) a timestamp of the last modification or synchronization. Extensions are not subjected to synchronization, except of those relevant for further synchronization. The last level of synchronization could be synchronized. Restrictions for parents might not be synchronized. Instead, the node could simply reflect the correct permissions according to the defined restriction when being sent to the parent server.

The synchronization procedure can be triggered by a change to the local aggregated information model instance, such as when a node is created, updated or removed. The synchronization procedure can also be triggered by the local aggregated information model instance and its parent (re-) establishing a connection. While the node set might hold all relevant information in various situations including: (1) whether node participates in synchronization, (2) when it got synchronized for the last time, and (3) whether it was subject to a modification (CUD) recently, the aggregated information model instance may keep track of a reference list of all affected nodes to be synchronized as an optimization feature. At runtime, the aggregated information model instance processes only those nodes not yet being synchronized. On cold-start, the aggregated information model instance processes all nodes when importing the node set to the address space of the OPC UA server.

Two examples of timestamp strategies will now be described. As a first example, a modification timestamp is recorded in response to a model modification. An advantage of this approach is that a node set has to be persisted anyway; the timestamp is then a part of the persistency. Once the parent server acknowledges that the node changes were received and the information model instance at the parent server is successfully updated accordingly, all nodes up to a certain timestamp can be considered as successfully synchronized. For this approach, synchronized nodes are pushed in strict chronological order. For a cold-start, this may result in additional runs, collecting all nodes to be synchronized and sorting them according to the timestamp. Nodes with an identical timestamp have to be sent (and acknowledged) together in a bulk operation to ensure the complete set of nodes with that timestamp can be considered as synchronized. Modifications are published once the previous message is acknowledged. Otherwise, messages might outrun each other, and the latest acknowledged timestamp would be higher while nodes with older timestamp are not yet acknowledged.

As a second example of a timestamp strategy, a timestamp occurs in response to acknowledgements. An advantage of this approach is that the chronological order of modifications is irrelevant. For cold-start, the processing of nodes can be performed in the order of the node occurrences. The local aggregated information model instance can simply publish the synchronization messages whenever it gets triggered or processes any node. Timestamping of acknowledgements has to be tracked for each node. This may result in persisting the node set after the modification on each acknowledgement, which works well in case of bulk operations. Alternatively, tracking timestamps may be according to a list stored separately from the node set itself.

Figure 3:
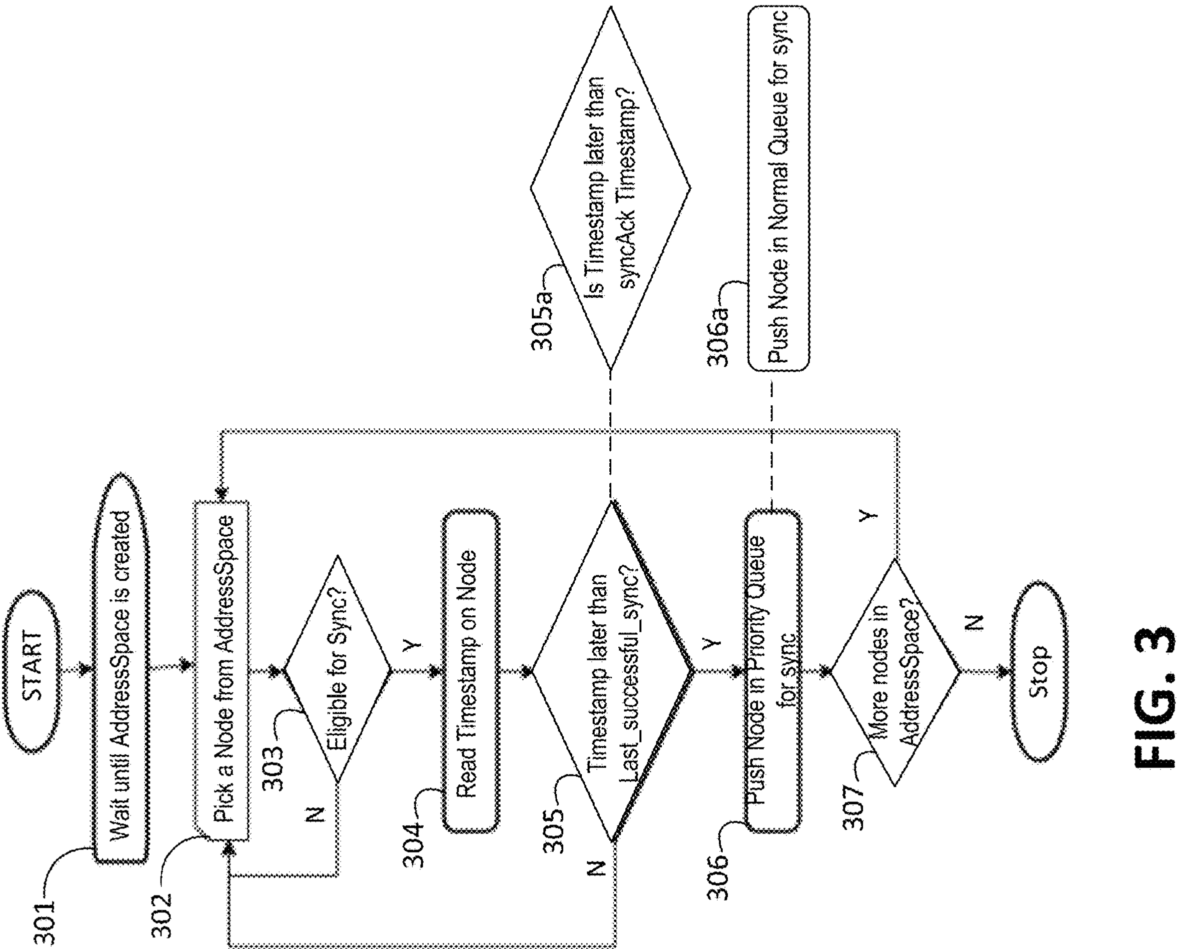
FIG. 3 shows an example of a method flowchart for synchronizing nodes in cold start scenario in accordance with embodiments of this disclosure.

FIG. 3 shows an example of a method flowchart for steps related to a cold start synchronization scenario in accordance with embodiments of this disclosure. In an embodiment implementing synchronization in response to modification, synchronization engine 112 annotates each node with a modification timestamp (i.e., a node-wise timestamp) for a time when the node was last modified. A global flag for an information model called Last_successful_sync is maintained with a timestamp value reflecting the last time at which the information model instance was successfully synchronized with another information model instance. For a cold start, the following steps are applied to each node related to a serialized node set that is to be pushed to a parent server. At step 301, the synchronization engine 112 waits until address space of the OPC UA server is created. A node is picked from the address space (step 302) and checked for whether the node is eligible for synchronization (step 303). As explained in Feature 4 above, not all nodes must be included in the synchronization in order to keep the synchronization efficient and manageable. For example, based on a cost/benefit analysis, it may be determined that all nodes of type "X" can be excluded from synchronization with minimal impact on the plant wide aggregated information models. As a particular example, node types that contain specific static information (e.g., device specific information that never changes) should be excluded in the synchronization. Also, blob data (i.e., unstructured data) produced by historical data dumps can be quite large and can be passed from child OPC UA server to parent OPC UA server on a different channel as part of a different process. Any nodes tied to such data is excluded from the synchronization. The exchange of information during the information model synchronization is reserved for small changes to OPC UA model.

If the picked node is eligible for synchronization, the modification timestamp of the node is read (step 304) and compared to the timestamp value of variable Last_successful_sync (step 305). If the read timestamp is later than timestamp value of variable Last_successful_sync, the node is pushed to a priority queue for synchronization (step 306). The priority queue can be a list of pending synchronizations sorted according to timestamp, starting with the earliest timestamp. For timestamp comparison at step 305, if timestamp is not later than timestamp value of variable Last_successful_sync, the process repeats steps 302-305 for the next node. At step 307, address space is scanned for more nodes to be checked for synchronization until all nodes are exhausted. All nodes in the priority queue are now ready to be serialized for synchronization.

In an alternative embodiment in which timestamps are recorded in response to acknowledgment of synchronization from parent server, each node is associated with two timestamps—(1) a modification timestamp reflecting the last modification to the node, and (2) a syncAck timestamp representing the time of the last synchronization acknowledgement by the parent server for the node update in the information model instance at the parent server. In an aspect, the value of syncAck can be stored in a separate file with node ID reference (e.g., a table or list of all node IDs and with respective syncAck timestamp values), and as such, annotation of the node with this timestamp is optional. In accordance with this alternative embodiment, the process shown in FIG. 3 is altered at step 305*a*, the modification timestamp is compared to the syncAck timestamp. Additionally, because identification of a node subject to modification is based on node-wise synchronization acknowledgment, there is no need for a prioritized queue, and altered step 306*a* reflects the push to a normal queue.

Figure 4:
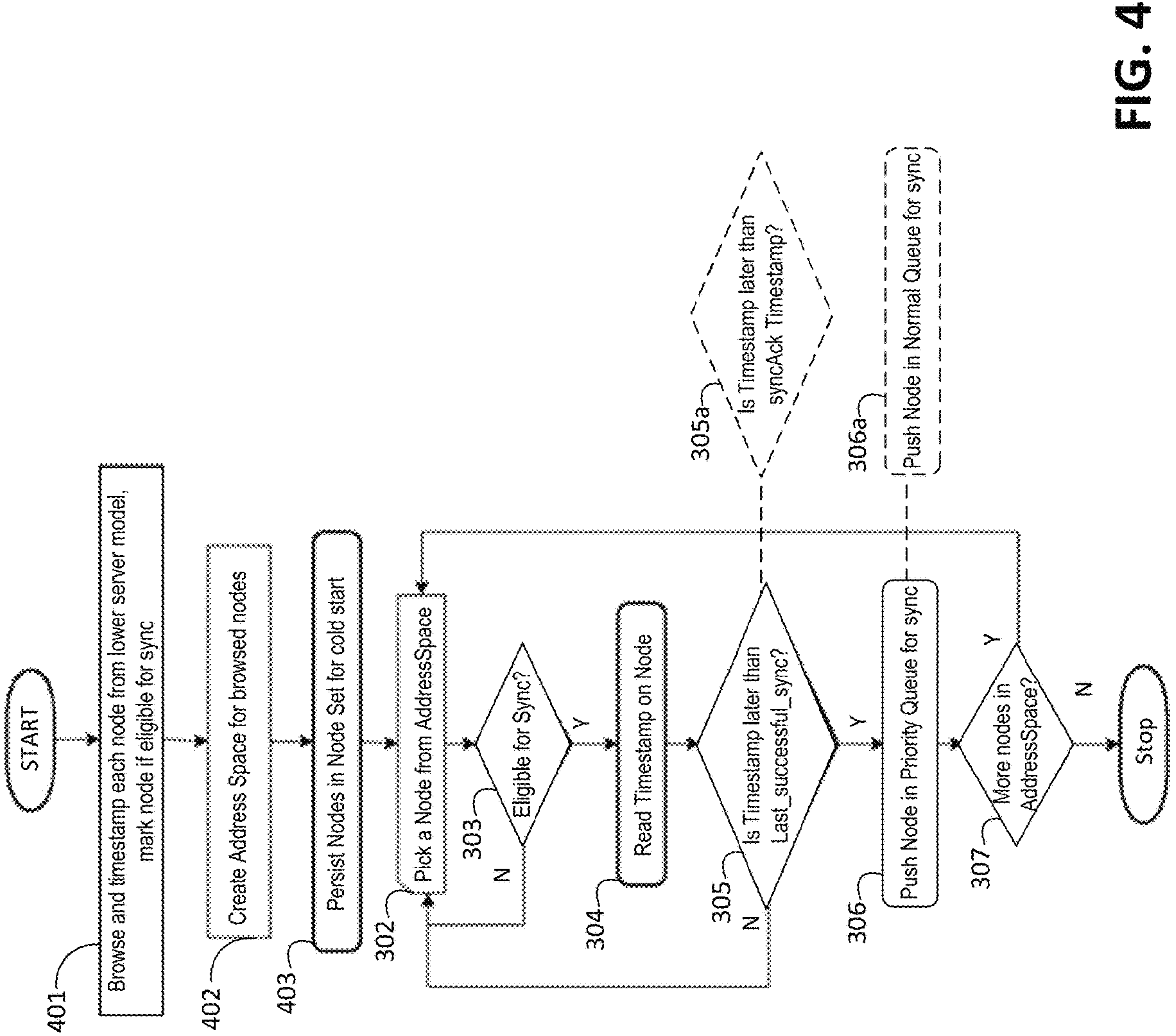
FIG. 4 shows an example of a method flowchart for synchronizing nodes in on-the-fly scenario in accordance with embodiments of this disclosure.

FIG. 4 shows an example of a method flowchart for steps related to an on-the-fly synchronization scenario during runtime in accordance with embodiments of this disclosure. In an embodiment for synchronization during runtime, each node subject to modification (added, updated, removed) is added to a node set with a current timestamp. In this example, nodes of a model instance at OPC UA server 110 are being compared to a model instance at OPC UA server 115. The synchronized node set may by persisted for later cold-start including the timestamps. A node is added to a list of pending syncs called Priority Queue, and this list is continuously sorted with each new entry having a latest timestamp being added to the end.

The method shown in FIG. 4 resembles the method described above for FIG. 3, sharing common steps 302-307. Additional steps 401-403 pertain to address space and persisting of nodes relevant to processing only those nodes not yet synchronized, which results in an efficient synchronization. The process begins by OPC UA server 115 checking for any updates to its own model, which would then need to be synchronized with parent OPC UA model. At step 401, synchronization engine 112 browses each node of information model for lower level OPC UA server 115 and timestamps each node at time of browsing. If eligible for synchronization (e.g., newly created, updated, or deleted), the node may be marked by synchronization engine 112 as eligible for synchronization. Address space at the OPC UA server 110 is created for newly browsed nodes at step 402. A node set of browsed nodes (e.g., Nodeset2.xml) is persisted at step 403. Steps 302-304, 305/305*a*, 306/306*a*, 307 are performed to generate the node set in the priority queue to be serialized for either timestamp approach as described above for FIG. 3. For this example, step 304 reads the browsed timestamp, and at step 305, the browsed timestamp is compared to timestamp value of variable Last_successful_sync. The node is already synchronized if browsed timestamp is not later than timestamp value of variable Last_successful_sync. Similarly, at step 305*a*, the browsed timestamp is compared to timestamp value of variable syncAck.

Figure 5:
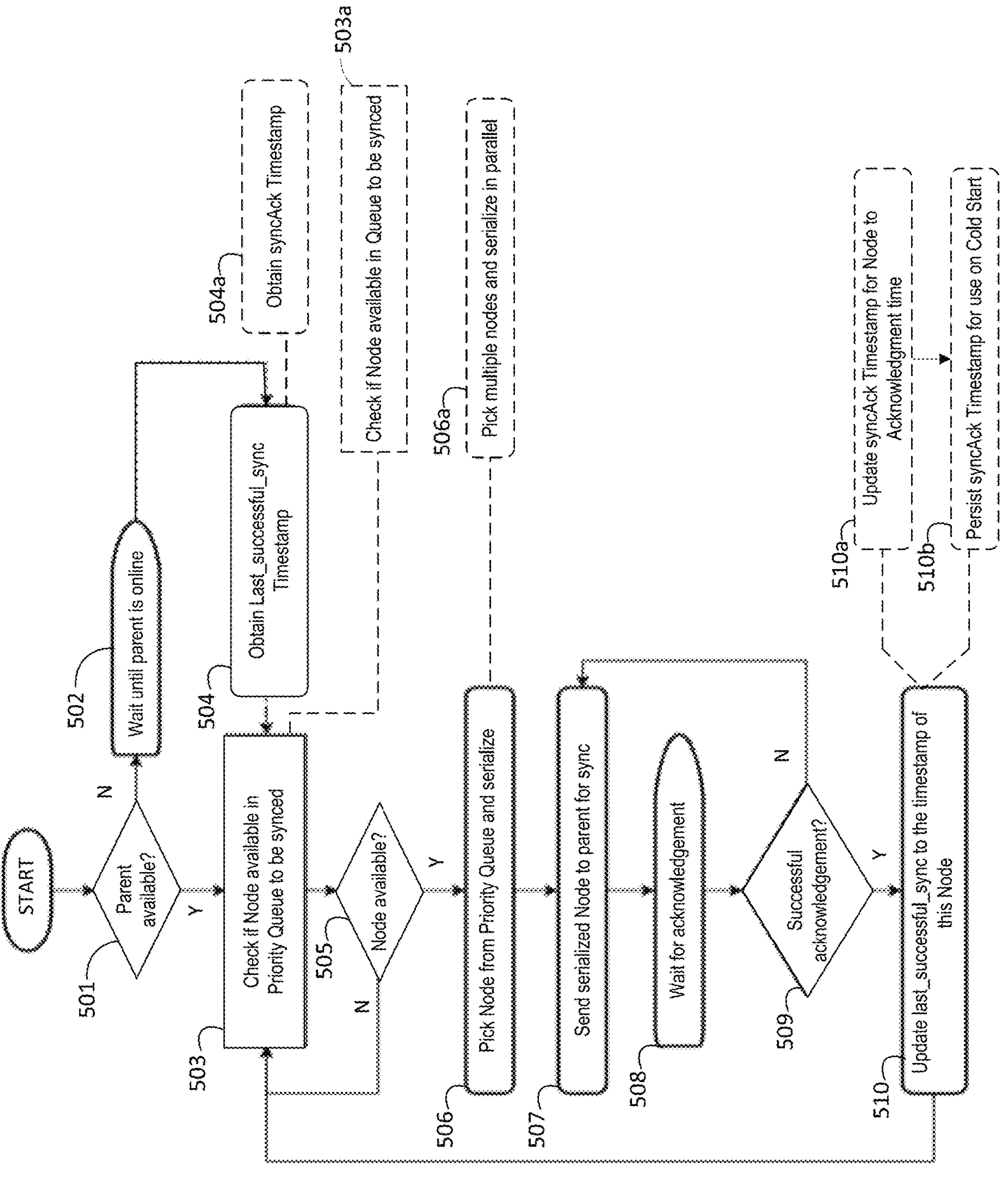
FIG. 5 shows an example of a of a method flowchart for the synchronization flow in accordance with embodiments of this disclosure.

FIG. 5 shows an example of a of a method flowchart for the serialization and synchronization of nodes in accordance with embodiments of this disclosure. In an embodiment, the synchronziation flow is in a parallel thread running and picking nodes from the Priority Queue when available. There is a global timestamp variable Last_successful_sync maintained at the information model level (i.e., timestamp for each node is compared against a common timestamp variable value (Last_successful_sync)). For this example, OPC UA server 110 is synchronizing its model instance with the information model instance of parent OPC UA server 122. At step 501, synchronization engine 112 checks if parent OPC UA server 122 is available. If not, the synchronization engine 112 waits for a parent to come online (step 502). When parent server goes online, the timestamp value for variable Last_successful_sync at local server is obtained from parent server (step 504). At step 503, each node is checked for whether it is available to be synchronized in Priority Queue. The Priority Queue is prioritized using the modification timestamp. At step 505, if the node is available, the node is picked from the Priority Queue and serialized (step 506). In an alternative embodiment in which timestamps are verified at node level, altered step 506*a* can be performed in parallel for multiple nodes. At least one serialized node is sent to the parent server in a sync message for synchronziation (step 507), and waits for acknowledgement (step 508). In case of multiple nodes with equal timestamp, all serialized nodes are included in the same sync message. If acknowledgement is received at step 509, the timestamp value for variable Last_successful_sync is updated with the timestamp value of the current node (step 510). If parent cannot be reached, or does not acknowledge in time, further attempts are made. Timestamps are local to the aggregated information model instance.

In an aspect, the parent OPC UA server may track child OPC UA server timestamps and provide a last known timestamp for Last_successful_sync when the communication link is established. In this case, parent server resets the timestamp variable Last-successful-sync for child OPC UA server (e.g., because the parent could not completely persist the last sync state or had to be rolled back to a historical state). If the timestamp could decrease (to prior point in time), all nodes are iterated like in the cold-start scenario, to find all nodes to be considered. Removed nodes should be kept for a while in the local node set before they are finally deleted.

In an alternative embodiment, in which timestamps are recorded in response to acknowledgment of synchronization from parent server, each node is associated with two timestamps—(1) a modification timestamp reflecting the last modification to the node, and (2) a syncAck timestamp representing the time of the last synchronization acknowledgement by the parent server for the node update in the information model instance at the parent server. In accordance with this alternative embodiment, because identification of a node subject to modification is based on node-wise synchronization acknowledgment, there is no need for a prioritized queue, and altered steps 503*a* and 506*a* reflects the normal (unprioritized) queue. Additionally, altered steps 510*a*, 510*b* reflect obtaining, updating and persisting of syncAck timestamp instead of global variable Last_successful_sync.

Figure 6:
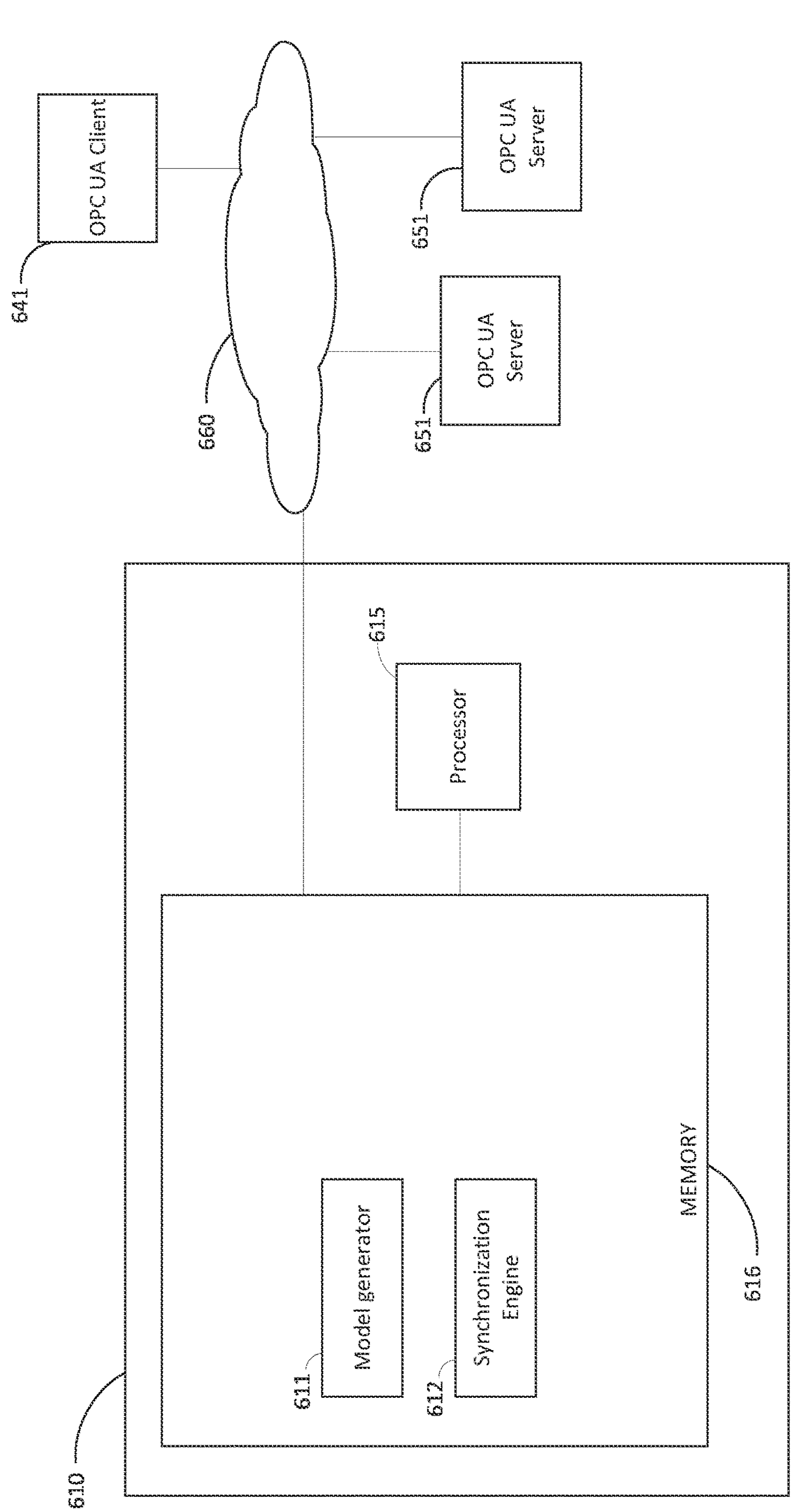
FIG. 6 illustrates an example of a computing environment within which embodiments of the disclosure may be implemented.

FIG. 6 shows an example of a computer environment within which embodiments of the disclosure may be implemented. A computing device 610 includes a processor 615 and memory 616 (e.g., a non-transitory computer readable medium) on which is stored various computer applications, modules or executable programs. In an embodiment, computing device 610 is used to implement OPC UA servers 110, 115-118 shown in FIG. 1. A model generator 611 module is used to implement functionality of the model generator 111 and synchronization engine module 612 is used to implement functionality of the synchronization engine 112, as described above.

A network 660, such as a local area network (LAN), wide area network (WAN), or an internet based network, connects one or more OPC UA clients 641 and OPC UA servers 651 to modules 611, 612 of computing device 610 for communication messages, pushed information, timestamps, and acknowledgements as described above.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device, partly on the computing device, as a stand-alone software package, partly on the computing device and partly on a remote computer or entirely on the computing device or server. In the latter scenario, the remote computer may be connected to the computing device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The program modules, applications, computer-executable instructions, code, or the like depicted in FIG. 6 as being stored in the system memory 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, and/or hosted on other computing device(s) accessible via one or more of the network(s) 660, may be provided to support functionality provided by the program modules, applications, or computer-executable code and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for synchronizing information model changes between hierarchical systems of smart factories, comprising:

maintaining a global timestamp variable for a last successful synchronization performed by a parent Open Platform Communications United Architecture (OPC UA) server, the synchronization being between a first aggregated information model instance stored in the parent OPC UA server and a second aggregated information model instance stored in a lower level OPC UA server;

for each node in the second aggregated information model, annotating the node with a node-wise timestamp in response to a modification to the node, wherein the modification includes one of a node addition, a node update, or a node deletion;

pushing all nodes subject to modification in the second aggregated information model to a priority queue as a serialized node set format having annotation extensions that include synchronization-relevant data;

synchronizing the first aggregated information model with the second aggregated information model by updating the nodes with the synchronization-relevant data; and sharing namespace array information related to the node ID.

2. The method of claim 1, further comprising:

updating the global timestamp variable for the last successful synchronization in response to the synchronization; and identifying a node subject to modification in the second aggregated information model in response to determining a later timestamp value for the node-wise timestamp compared to the value of the global timestamp variable.

3. The method of claim 1, wherein the synchronization-relevant data includes at least one of:

an indication of whether the node participates in synchronization;

any restrictions for the parent OPC UA server, including adjusted permissions;

scope of synchronization levels; or a timestamp of the last modification or synchronization.

4. The method of claim 1, wherein the synchronization is triggered by the modification of one or more nodes in the aggregated information model at the lower level OPC UA server.

5. The method of claim 1, wherein the synchronization is triggered by an established or re-established connection between the lower level OPC UA server and the parent OPC UA server.

6. A method for synchronizing information model changes between hierarchical systems of smart factories, comprising:

maintaining a node-wise timestamp variable syncAck for a time of acknowledgment of a synchronization performed by a parent Open Platform Communications United Architecture (OPC UA) server, the synchronization being between a first aggregated information model instance stored in the parent OPC UA server and a second aggregated information model instance stored in a lower level OPC UA server, the synchronization related to a node subject to modification;

annotating the node with a node-wise timestamp in response to a modification to the node, wherein the modification includes one of a node addition, a node update, or a node deletion;

pushing the node subject to modification in the second aggregated information model to a queue as a serialized node set format having annotation extensions that include synchronization-relevant data;

synchronizing the first aggregated information model with the second aggregated information model by updating the nodes with the synchronization-relevant data; and sharing namespace array information related to the node ID.

7. The method of claim 6, further comprising:

receiving, at the lower level OPC UA server from the parent OPC UA server, an acknowledgment of synchronization of the first aggregated information model with respect to a modified node;

updating the timestamp variable syncAck with time of the acknowledgment; and identifying the node subject to modification in the second aggregated information model in response to determining a later timestamp value for the node-wise timestamp compared to the value of the node-wise timestamp variable a time of acknowledgment of a synchronization.

8. The method of claim 6, wherein the synchronization-relevant data includes at least one of:

an indication of whether the node participates in synchronization;

any restrictions for a parent OPC UA server, including adjusted permissions;

scope of synchronization levels; or a timestamp of the last modification or synchronization.

9. The method of claim 6, wherein the synchronization is triggered by the modification of one or more nodes in the aggregated information model at the lower level OPC UA server.

10. The method of claim 6, wherein the synchronization is triggered by an established or re-established connection between the lower level OPC UA server and the parent OPC UA server.

11. A system for synchronizing information model changes between hierarchical systems of a smart factory, comprising:

a processor; and a memory having modules with instructions stored thereon executable by the processor, the modules comprising:

a model generator configured to instantiate objects for an aggregated information model for each of a plurality of subsystems in the smart factory, the aggregated information model in accordance with objects defined by an Open Platform Communications United Architecture (OPC UA) standardized model;

a synchronization engine configured to:

maintain a global timestamp variable for a last successful synchronization performed by a parent OPC UA server, the synchronization being between a first aggregated information model instance stored in the parent OPC UA server and a second aggregated information model instance stored in a lower level OPC UA server;

for each node in the second aggregated information model, annotating the node with a node-wise timestamp in response to a modification to the node, wherein the modification includes one of a node addition, a node update, or a node deletion;

push all nodes subject to modification in the second aggregated information model to a priority queue as a serialized node set format having annotation extensions that include synchronization-relevant data;

synchronize the first aggregated information model with the second aggregated information model by updating the nodes with the synchronization-relevant data.

12. The system of claim 11, wherein the synchronization engine is further configured to:

update the global timestamp variable for the last successful synchronization in response to the synchronization; and identify a node subject to modification in the second aggregated information model in response to determining a later timestamp value for the node-wise timestamp compared to the value of the global timestamp variable.

13. The system of claim 11, wherein the synchronization-relevant data includes at least one of:

an indication of whether the node participates in synchronization;

any restrictions for the parent OPC UA server, including adjusted permissions;

scope of synchronization levels; or a timestamp of the last modification or synchronization.

* * * * *